US012463352B2

(12) United States Patent
Singh et al.

(10) Patent No.: US 12,463,352 B2
(45) Date of Patent: Nov. 4, 2025

(54) CIRCULARLY POLARIZED ARRAY ANTENNA FOR MILLIMETER WAVE COMMUNICATIONS

(71) Applicant: KYOCERA AVX Components (San Diego), Inc., San Diego, CA (US)

(72) Inventors: Abhishek Singh, San Diego, CA (US); Sebastian Rowson, San Diego, CA (US)

(73) Assignee: KYOCERA AVX Components (San Diego), Inc., San Diego, CA (US)

(*) Notice: Subject to any disclaimer, the term of this patent is extended or adjusted under 35 U.S.C. 154(b) by 0 days.

(21) Appl. No.: 18/352,852

(22) Filed: Jul. 14, 2023

(65) Prior Publication Data

US 2023/0361482 A1 Nov. 9, 2023

Related U.S. Application Data

(63) Continuation of application No. 17/569,571, filed on Jan. 6, 2022, now Pat. No. 11,742,590.

(60) Provisional application No. 63/134,900, filed on Jan. 7, 2021.

(51) Int. Cl.

*H01Q 21/06* (2006.01)
*H01Q 3/36* (2006.01)
(Continued)

(52) U.S. Cl.

CPC ............. *H01Q 21/062* (2013.01); *H01Q 3/36* (2013.01); *H01Q 5/378* (2015.01); *H01Q 5/48* (2015.01);
(Continued)

(58) Field of Classification Search

CPC ........ H01Q 21/062; H01Q 3/36; H01Q 5/378; H01Q 5/48; H01Q 7/00; H01Q 9/0492; H01Q 9/265; H01Q 21/24; H01Q 3/28
See application file for complete search history.

(56) References Cited

U.S. PATENT DOCUMENTS 6,456,243 B1 9/2002 Poilasne et al.
6,717,551 B1 4/2004 Desclos et al.
(Continued)

FOREIGN PATENT DOCUMENTS

KR 10-2020-0097621 8/2020
WO WO 03/092118 11/2003
(Continued)

OTHER PUBLICATIONS

Singh, "Miniaturized Right Hand Circularly Polarized Antenna for GPS Applications", 2015 Institute of Electrical and Electronics Engineers Fourth Asia/Pacific Conference on Antennas and Propagation (APCAP), Bali, Indonesia, Jun. 30-Jul. 3, 2015, 3 pages.
(Continued)

*Primary Examiner* — Dameon E Levi
*Assistant Examiner* — Yonchan J Kim
(74) *Attorney, Agent, or Firm* — Dority & Manning, P.A.

(57) ABSTRACT

A circularly polarized array antenna is provided. The circularly polarized array antenna includes a ground plane and a plurality of circularly polarized antennas. Each of the circularly polarized antennas is configured to communicate over a frequency band ranging from 24 gigahertz (GHz) to 52 GHz. Each of the circularly polarized antennas includes a column substrate coupled to the ground plane. The column substrate includes a plurality of faces. Each of the circularly polarized antennas further includes a plurality of isolated magnetic dipole elements. Each of the isolated magnetic dipole elements is disposed on a different face of the column substrate.

10 Claims, 10 Drawing Sheets

(51) Int. Cl.

| | |
|---|---|
| ***H01Q 5/378*** | (2015.01) |
| ***H01Q 5/48*** | (2015.01) |
| ***H01Q 7/00*** | (2006.01) |
| ***H01Q 9/04*** | (2006.01) |
| ***H01Q 9/26*** | (2006.01) |
| ***H01Q 21/24*** | (2006.01) |

(52) U.S. Cl.
CPC ............. *H01Q 7/00* (2013.01); *H01Q 9/0492* (2013.01); *H01Q 9/265* (2013.01); *H01Q 21/24* (2013.01)

(56) References Cited

U.S. PATENT DOCUMENTS

| | | | | |
|---|---|---|---|---|
| 6,744,410 | B2 | 6/2004 | Shamblin et al. | |
| 6,943,730 | B2 | 9/2005 | Poilasne et al. | |
| 7,663,556 | B2 | 2/2010 | Desclos et al. | |
| 7,696,932 | B2 | 4/2010 | Desclos et al. | |
| 2015/0311600 | A1* | 10/2015 | Singh | H01Q 7/00 343/814 |
| 2019/0267716 | A1* | 8/2019 | Yoon | H01Q 13/0233 |
| 2021/0328351 | A1* | 10/2021 | Avser | H01Q 9/0485 |

FOREIGN PATENT DOCUMENTS

| | | |
|---|---|---|
| WO | WO 2007/020446 | 2/2007 |
| WO | WO 2018/060663 | 4/2018 |

OTHER PUBLICATIONS

International Search Report and Written Opinion for Application No. PCT/US2022/011381, mailed May 3, 2022, 14 pages.

* cited by examiner

CIRCULARLY POLARIZED ARRAY ANTENNA FOR MILLIMETER WAVE COMMUNICATIONS

PRIORITY CLAIM

The present application claims priority to U.S. application Ser. No. 17/569,571, filed Jan. 6, 2022, titled "Circularly Polarized Array Antenna for Millimeter Wave Communications", which claims the benefit of priority of U.S. Provisional App. No. 63/134,900, titled "Circularly Polarized Array Antenna for Millimeter Wave Communications" and having a filing date of Jan. 7, 2021, which is incorporated by reference herein.

FIELD

The present disclosure relates generally to phased array antennas. More particularly, the present disclosure relates to a circularly polarized array antenna for millimeter wave communications.

BACKGROUND

Antenna systems configured for millimeter-wave communications (e.g., 5th generation mobile communications) can include a phase shifter circuit and a phased array antenna electrically coupled to the phase shifter circuit. The phase shifter circuit can alter a phase of a RF signal received from a RF source such that a phase of the RF signal measured at an output of the RF phase shifter circuit is different relative to a phase of the RF signal measured at an input of the RF phase shifter circuit. In this manner, the RF phase shifter circuit can control a phase shift of the RF signal to steer a radiation pattern associated with the phased array antenna.

SUMMARY

Aspects and advantages of embodiments of the present disclosure will be set forth in part in the following description, or may be learned from the description, or may be learned through practice of the embodiments.

In one aspect, a circularly polarized array antenna is provided. The circularly polarized array antenna includes a ground plane and a plurality of circularly polarized antennas. Each of the circularly polarized antennas is configured to communicate over a frequency band ranging from 24 gigahertz (GHz) to 52 GHz. Each of the circularly polarized antennas includes a column substrate coupled to the ground plane. The column substrate includes a plurality of faces. Each of the circularly polarized antennas further includes a plurality of isolated magnetic dipole elements. Each of the isolated magnetic dipole elements is disposed on a different face of the column substrate.

In another aspect, an antenna system is provided. The antenna system includes a phase shifter circuit. The phase shifter circuit includes a plurality of phase shifters. Each of the phase shifters is electrically coupled to a radio frequency (RF) source. The antenna system further includes a circularly polarized array antenna. The circularly polarized array antenna is electrically coupled to the phased shifter circuit. The circularly polarized array antenna includes a ground plane and a plurality of circularly polarized antennas. Each of the circularly polarized antennas is configured to communicate over a frequency band ranging from 24 gigahertz (GHz) to 52 GHz. Each of the circularly polarized antennas includes a column substrate coupled to the ground plane. The column substrate includes a plurality of faces. Each of the circularly polarized antennas further includes a plurality of isolated magnetic dipole elements. Each of the isolated magnetic dipole elements is disposed on a different face of the column substrate.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
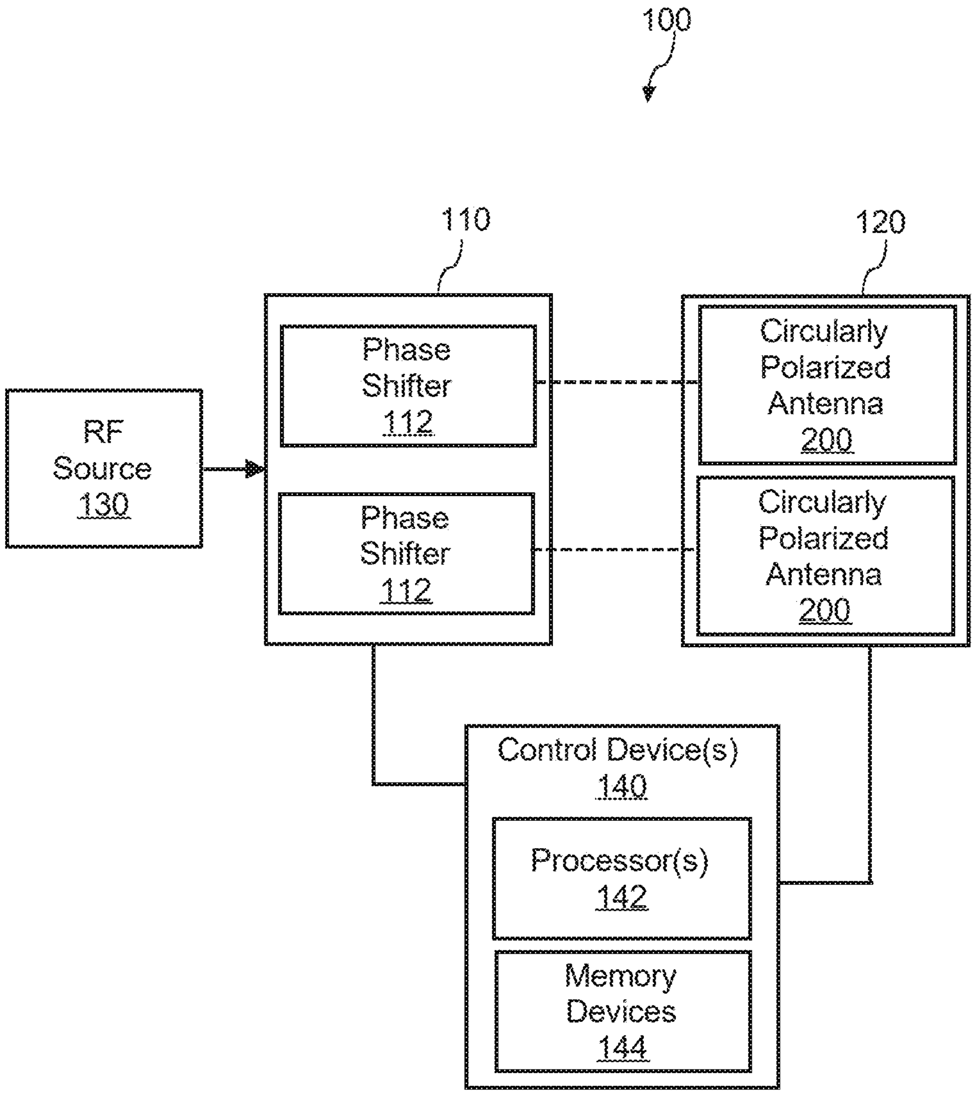
FIG. 1 depicts a block diagram of components of an antenna system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Phased array antennas include a plurality of antenna cells. Each of the plurality of antenna cells can be electrically coupled to a phase shifter circuit. The phase shifter circuit can be configured to control a phase shift associated with a RF signal provided to the phased array antenna. By controlling the phase shift associated with the RF signal, a radiation pattern associated with the phased array antenna can be steered without physically moving one or more of the antenna cells.

Example aspects of the present disclosure are directed to a circularly polarized array antenna for millimeter wave communications. The circularly polarized array antenna can include a plurality of circularly polarized antennas. For instance, in some implementations, the circularly polarized array antenna can include 128 circularly polarized antennas. In alternative implementations, the circularly polarized array antenna can include more or fewer circularly polarized antennas. Each of the circularly polarized antennas can be configured to communicate over a frequency band associated with millimeter wave communications (e.g., about 24 GHz to about 52 GHz). Details of the circularly polarized antennas will now be discussed in more detail.

Each of the circularly polarized antennas can include a column substrate coupled to a ground plane. The column substrate can include a plurality of faces. For instances, in some implementations, the column substrate can include four separate faces (e.g., a first face, a second face, a third face, and a fourth face). In alterative implementations, the column substrate can include more or fewer faces.

Each of the circularly polarized antennas can further include a plurality of isolated magnetic dipole elements. Furthermore, each of the isolated magnetic dipole elements can be disposed on a different face of the column substrate. For instance, in some implementations, each of the circularly polarized antennas can include four isolated magnetic dipole elements. In such implementations, a first isolated magnetic dipole element can be disposed on a first face of the column substrate, a second isolated magnetic dipole element can be disposed on a second face of the column substrate, a third isolated magnetic dipole element can be disposed on a third face of the column substrate, and a fourth isolated magnetic dipole element can be disposed on a fourth face of the column substrate.

Each of the isolated magnetic dipole elements can be electrically coupled to an RF source via a phase shifter circuit. In this manner, a RF signal generated by the RF source can be provided to each of the isolated magnetic dipole elements via the phase shifter circuit. Furthermore, the phase shifter circuit can be configured to adjust a phase angle associated with the RF signal. In this manner, the phase angle of the RF signal provided to each of the isolated magnetic dipole elements can be different. For instance, in some implementations, the phase shifter circuit can provide a first RF signal to a first isolated magnetic dipole element, a second RF signal to a second isolated magnetic dipole element, a third RF signal to a third isolated magnetic dipole element, and a fourth RF signal to a fourth isolated magnetic dipole element. The second RF signal can be 90 degrees out-of-phase relative to the first RF signal. The third RF signal can be 180 degrees out-of-phase relative to the first RF signal. The fourth RF signal can be 270 degrees out-of-phase relative to the first RF signal.

In some implementations, each of the circularly polarized antennas can include a parasitic element. The parasitic element can be electromagnetically coupled with a corresponding isolated magnetic dipole element. In this manner, the electromagnetic coupling between the parasitic element can allow each of the circularly polarized antennas to be tuned to at least a first frequency on the frequency band and a second frequency on the frequency band. For instance, in some implementations, the first frequency can be about 28 GHz, whereas the second frequency can be about 39 GHz.

The circularly polarized array antenna according to example aspects of the present disclosure provides numerous technical effects and benefits. For instance, the circularly polarized array antenna can provide radiation patterns that are circularly polarized (e.g., left-hand circularly polarized, right-hand circularly polarized) on the frequency band associated with millimeter wave communications.

As used herein, the use of the term "about" in conjunction with a numerical value is intended to refer to within 20% of the stated amount. In addition, the terms "first" and "second" may be used interchangeably to distinguish one component from another and are not intended to signify location or importance of the individual components.

Referring now to the FIGS., FIG. 1 depicts an antenna system 100 according to example embodiments of the present disclosure. As shown, the antenna system 100 can include a RF phase shifter circuit 110 and a circularly polarized array antenna 120. The RF phase shifter circuit 110 can include a plurality of millimeter wave phase shifters 112. Each of the millimeter wave phase shifters 112 can be electrically coupled to a RF source 130. In this manner, each of the millimeter wave phase shifters 112 can receive a RF signal from the RF source 130. The RF signal can be associated with millimeter wave communications. In this manner, a frequency of the RF signal can range from about 24 GHz to about 52 GHz. For instance, in some implementations, the frequency of the RF signal can range from 24 GHz to 30 GHz. In alternative implementations, the frequency of the RF signal can range from 30 GHz to 40 GHz. It should be understood that each of the millimeter wave phase shifters 112 can be configured to control a phase shift of the RF signal received from the RF source 130. In this manner, the radiation pattern of RF waves emitted via the circularly polarized array antenna 120 can be steered without physically moving one or more circularly polarized antennas 200 of the circularly polarized array antenna 120.

The antenna system 100 can include one or more control devices 140. The one or more control devices 140 can be communicatively coupled to the circularly polarized array antenna 120. In this manner, the one or more control devices 140 can be configured to control one or more circularly polarized antennas 200 of the circularly polarized array antenna 120 to steer a radiation pattern associated with the circularly polarized array antenna 120 along at least one of an azimuth plane or an elevation plane.

Furthermore, in some implementations, the one or more control devices 140 can be communicatively coupled to the RF phase shifter circuit 110. In this manner, the one or more control devices 140 can be configured to control the millimeter wave phase shifters 112 thereof to steer the radiation pattern of the circularly polarized array antenna 120 along at least one of the azimuth plane or the elevation plane.

As shown, the one or more control devices 140 can include one or more processors 142 and one or more memory devices 144. The one or more processors 142 can include any suitable processing device, such as a microprocessor, microcontroller, integrated circuit, logic device, or other suitable processing device. The one or more memory devices 144 can include one or more computer-readable media, including, but not limited to, non-transitory computer-readable media, RAM, ROM, hard drives, flash drives, or other memory devices.

The one or more memory devices 144 can store information accessible by the one or more processors 142, including computer-readable instructions that can be executed by the one or more processors 142. The computer-readable instructions can be any set of instructions that, when executed by the one or more processors 142, cause the one or more processors 142 to perform operations. The computer-readable instructions can be software written in any suitable programming language or may be implemented in hardware. In some implementations, the computer-readable instructions can be executed by the one or more processors to cause the one or more processors to perform operations, such as controlling the circularly polarized antennas 200 of the circularly polarized array antenna 120. Additionally, the operations can include controlling one or more millimeter wave phase shifters 112 of the RF phase shifter circuit 110.

Figure 2:
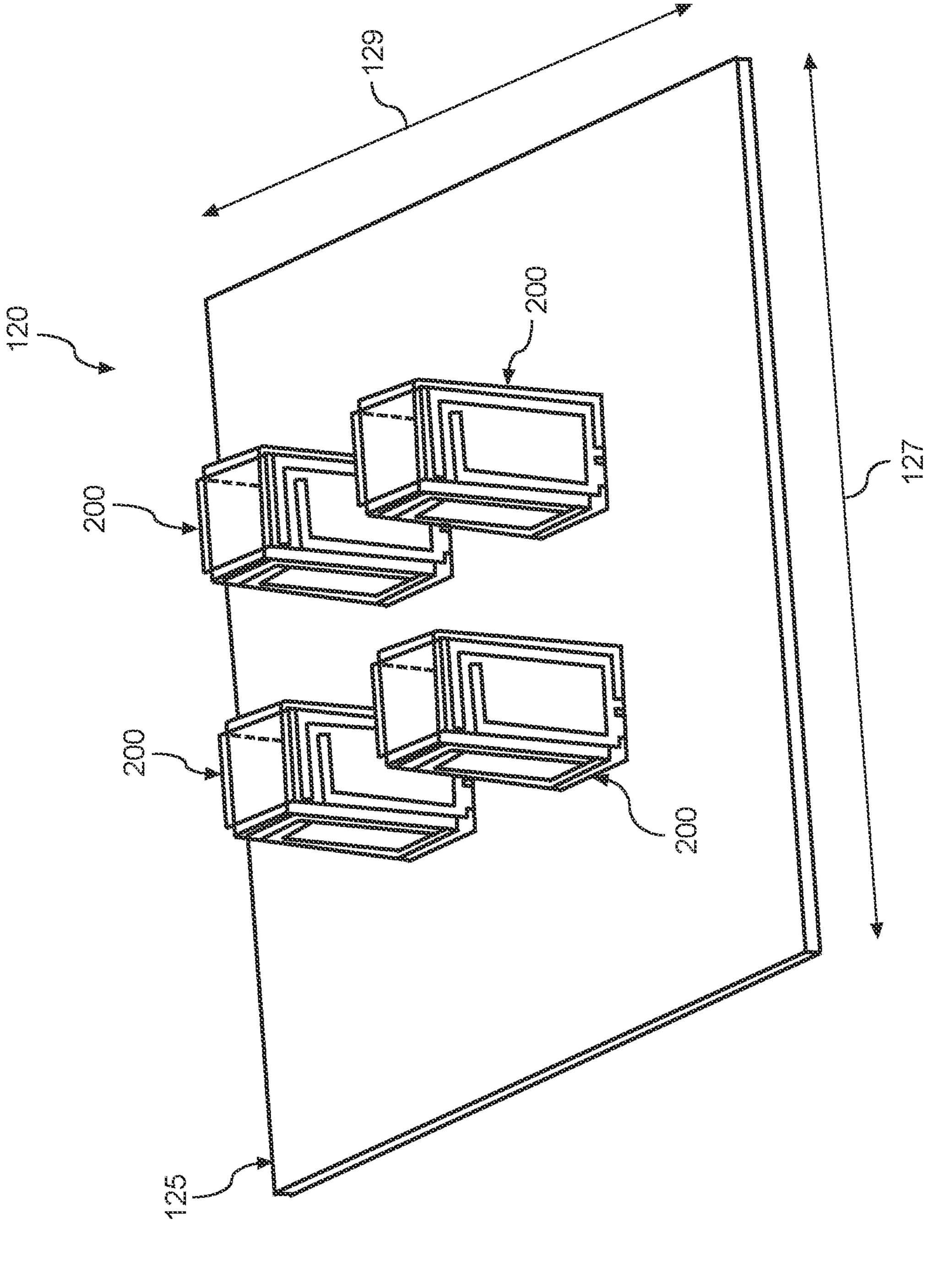
FIG. 2 depicts a circularly polarized array antenna according to example embodiments of the present disclosure.

Referring now to FIG. 2, an example embodiment of the circularly polarized array antenna 120 is provided according to example embodiments of the present disclosure. As shown, in some implementations, the circularly polarized array antenna 120 can include a ground plane 125. In some implementations, a length dimension 127 of the ground plane 125 can be substantially the same (e.g., within about 10 millimeters) as a width dimension 129 of the ground plane 125. In alternative implementations, the length dimension 127 of the ground plane 125 can be different (e.g., longer, shorter) than the width dimension 129 of the ground plane 125.

As shown, in some implementations, the circularly polarized array antenna 120 can include 4 circularly polarized antennas 200 arranged on the ground plane 125 in a row-column configuration. For instance, the row-column configuration can include 2 rows of circularly polarized antennas 200 and 2 columns of circularly polarized antennas 200. It should be understood that, in alternative implementations, the circularly polarized array antenna 120 can include more or fewer circularly polarized antennas 200. Details of the circularly polarized antennas 200 will now be discussed in more detail.

Figure 3:
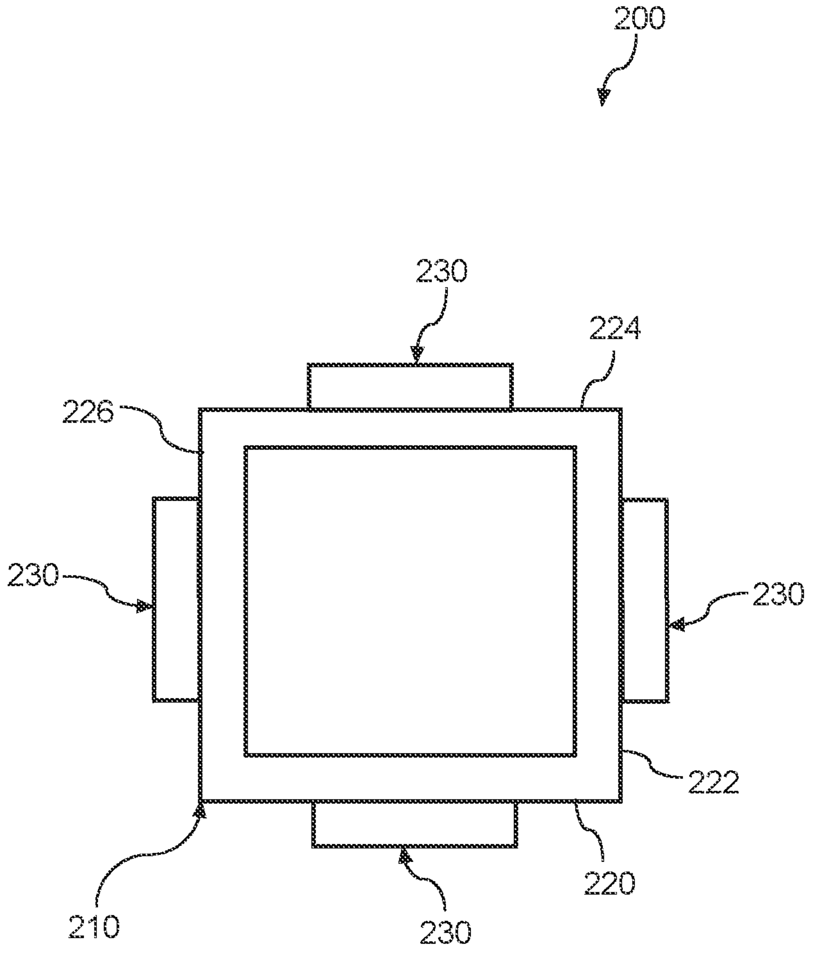
FIG. 3 depicts components of a circularly polarized antenna of a circularly polarized array antenna according to example embodiments of the present disclosure.
Figure 4:
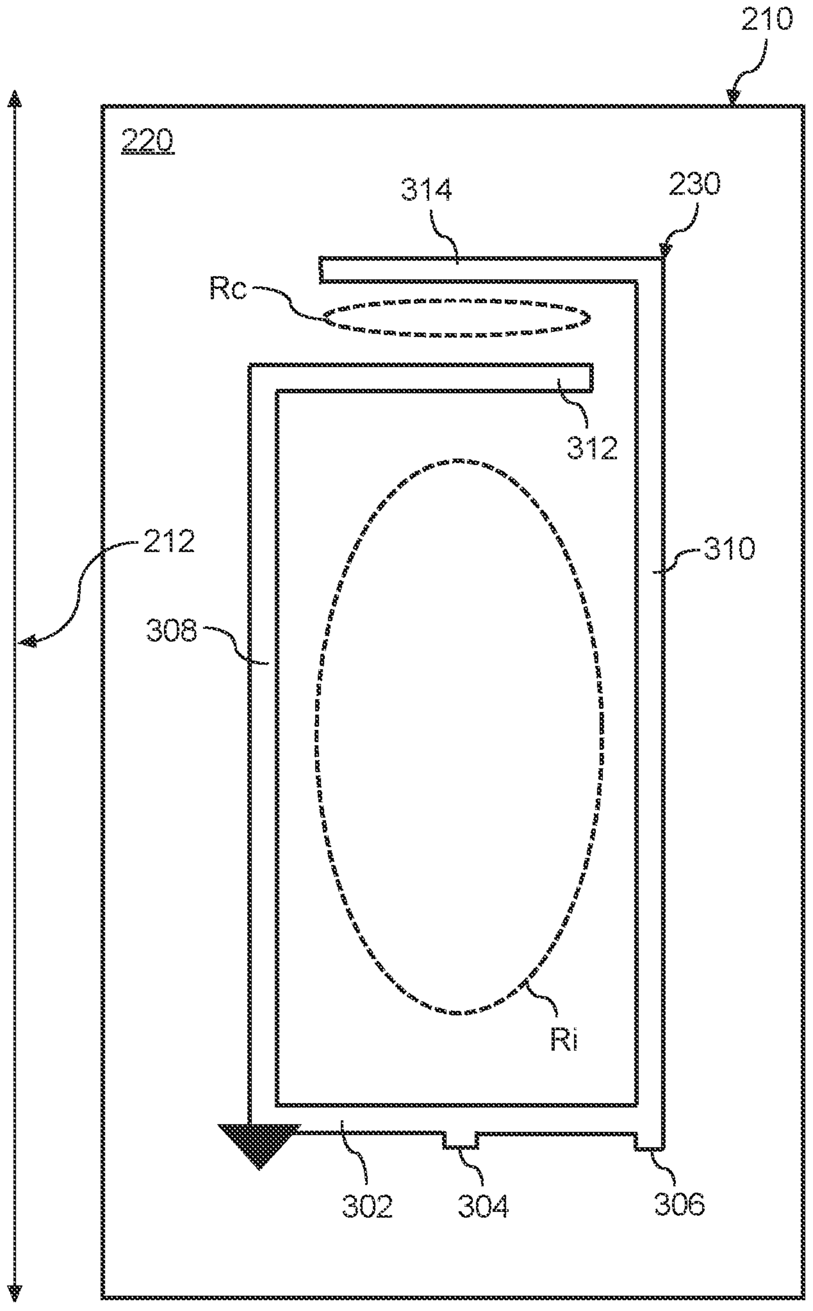
FIG. 4 depicts a schematic of the circularly polarized antenna of FIG. 3 according to example embodiments of the present disclosure.

Referring now to FIGS. 3 and 4, an example embodiment of a circularly polarized antenna 200 of the circularly polarized array antenna 120 (FIG. 2) is provided. As shown, the circularly polarized antenna can include a column substrate 210. The column substrate 210 can be disposed on the ground plane 125 (FIG. 2) of the circularly polarized array antenna 120 (FIG. 2). In some implementations, a height 212 of the column substrate 210 can be shorter than the length dimension 127 (FIG. 2) of the ground plane 125 and the width dimension 129 of the ground plane 125. As shown, the column substrate 210 can include a plurality of faces. For instance, in some implementations, the column substrate 210 can include a first face 220, a second face 222, a third face 224, and a fourth face 226. In alternative implementations, the column substrate 210 can include more or fewer faces.

Each of the circularly polarized antennas 200 can include a plurality of isolated magnetic dipole elements 230. Each of the isolated magnetic dipole elements 230 can be disposed on a different face (e.g., first face 220, second face 222, third face 224, fourth face 226) of the column substrate 210. Furthermore, each of the isolated magnetic dipole elements 230 can be electrically coupled to the RF source 130 (FIG. 1) via the RF phase shifter circuit 110 (FIG. 1). In this manner, a RF signal generated by the RF source 130 can be provided to each of the isolated magnetic dipole elements 230 via the RF phase shifter circuit 110.

In some implementations, the RF phase shifter circuit 110 can provide a first RF signal to the isolated magnetic dipole element 230 disposed on the first face 220 of the column substrate 210, a second RF signal to the isolated magnetic dipole element 230 disposed on the second face 222 of the column substrate 210, a third RF signal to the isolated magnetic dipole element 230 disposed on the third face 224 of the column substrate 210, and a fourth RF signal to the isolated magnetic dipole element 230 disposed on the fourth face 226 of the column substrate 210. The second RF signal can be 90 degrees out-of-phase relative to the first RF signal. The third RF signal can be 180 degrees out-of-phase relative to the first RF signal. The fourth RF signal can be 270 degrees out-of-phase relative to the first RF signal.

In some implementations, the isolated magnetic dipole element 230 can include a bent conductor. As shown, the bent conductor can include a bottom portion 302 that can be coupled to the RF phase shifter circuit 110 (FIG. 1). In addition, the bottom portion 302 can include one or more ground connections 304, 306. The bent conductor can include a pair of vertical portions extending from opposing ends of the bottom portion 302 For instance, the bent conductor can include a first vertical portion 308 extending from a first end of the bottom portion 302 and a second vertical portion 310 extending from a second end of the bottom portion 302. The bent conductor can further include a first horizontal portion 312 and a second horizontal portion 314. The first horizontal portion 312 can extend from a distal end (e.g. farthest from bottom portion 302) of the first vertical portion 308. The second horizontal portion 314 can extend from a distal end of the second vertical portion 310. As shown, the first horizontal portion 312 and the second horizontal portion 314 can overlap with one another to form a capacitive region $R_C$ therebetween. In addition, the bottom portion 302, first vertical portion 308, second vertical portion 310, first horizontal portion 312, and second horizontal portion 314 can collectively form a loop about which an inductive region $R_i$ is formed.

Figure 5:
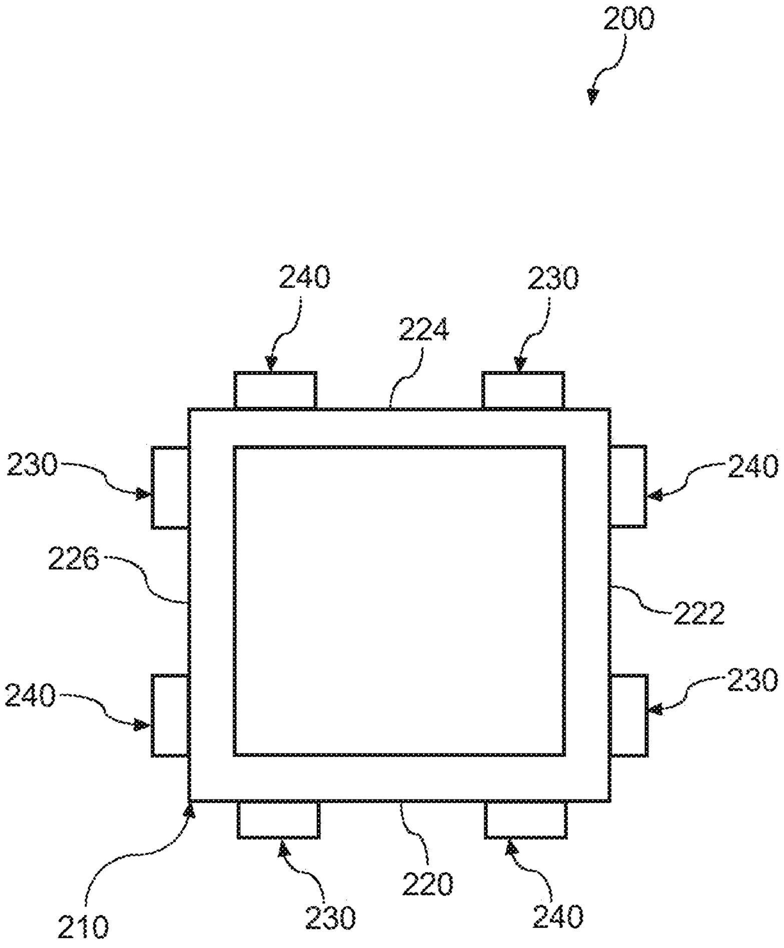
FIG. 5 depicts components of a circularly polarized antenna of a circularly polarized array antenna according to example embodiments of the present disclosure.
Figure 6:
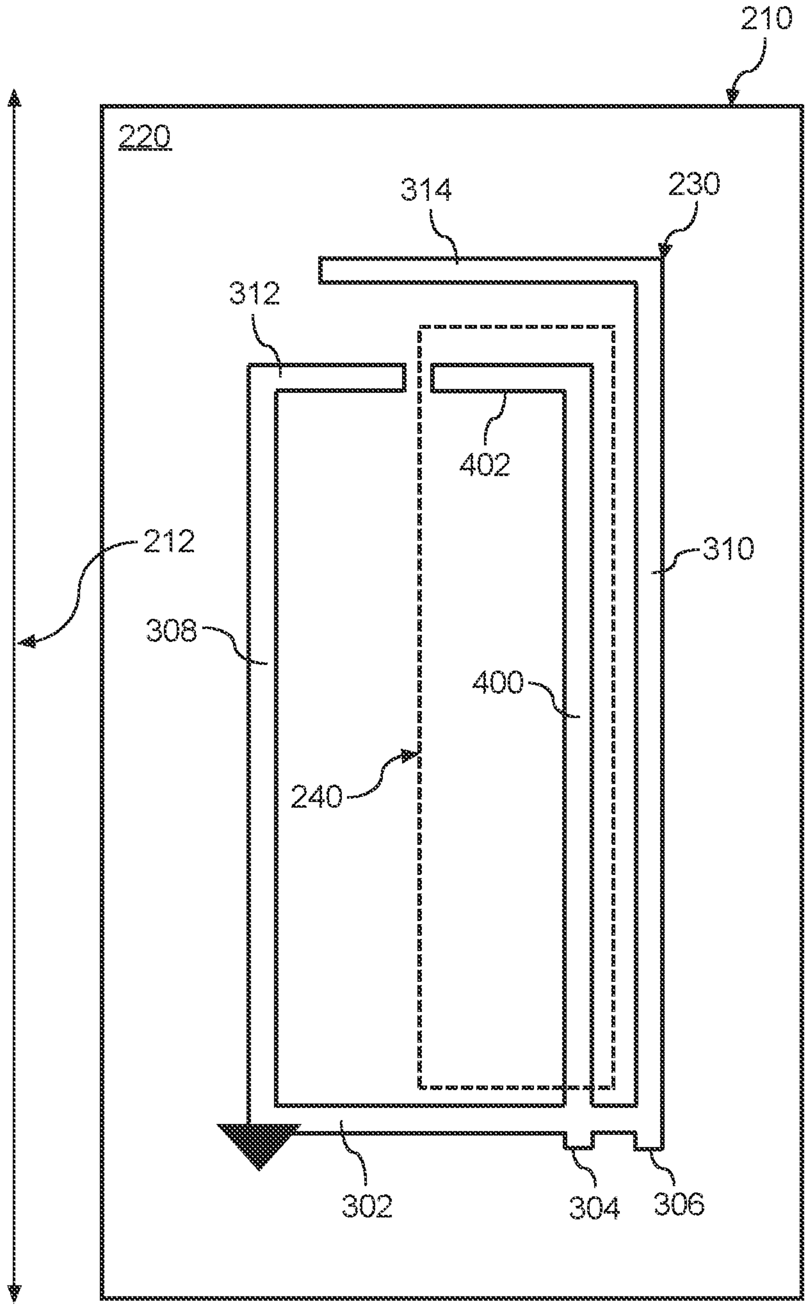
FIG. 6 depicts a schematic of the circularly polarized antenna of FIG. 5 according to example embodiments of the present disclosure.

Referring now to FIGS. 5 and 6, another example embodiment of a circularly polarized antenna 200 of the circularly polarized array antenna 120 (FIG. 2) is provided. The circularly polarized antenna 200 can be configured in substantially the same manner as the circularly polarized antenna 200 discussed above with reference to FIGS. 3 and 4. For instance, the circularly polarized antenna 200 can include the column substrate 210 and the plurality of isolated magnetic dipole elements 230. In addition, the circularly polarized antenna 200 of FIGS. 5 and 6 can include a plurality of parasitic elements 240. Details of the parasitic elements 240 will now be discussed in more detail.

As shown, each of the parasitic elements 240 can be disposed on a different face (e.g., first face 220, second face 222, third face 224, fourth face 226) of the column substrate 210. Each of the parasitic elements 240 can be electromagnetically coupled with a corresponding isolated magnetic dipole element 230. In this manner, the electromagnetic coupling between the parasitic element 240 and the corresponding isolated magnetic dipole element 230 can allow the circularly polarized antenna 200 to be tuned to at least a first frequency on the frequency band and a second frequency on the frequency band. For instance, in some implementations, the first frequency can be about 28 GHz, whereas the second frequency can be about 39 GHz.

In some implementations, the parasitic element 240 can be integral with the corresponding isolated magnetic dipole element 230. For instance, as shown in FIG. 6, the parasitic element 240 and corresponding isolated magnetic dipole element 230 can be configured as a bent conductor configured in substantially the same manner as the bent conductor discussed above with reference to FIG. 4. As shown, the parasitic element 240 can include a vertical portion 400 extending from the bottom portion 302 of the bent conductor. In addition, the parasitic element 240 can include a horizontal portion 402 extending from a distal end (e.g., farthest from bottom portion 302 of bent conductor) of the vertical portion 400

Figure 7:
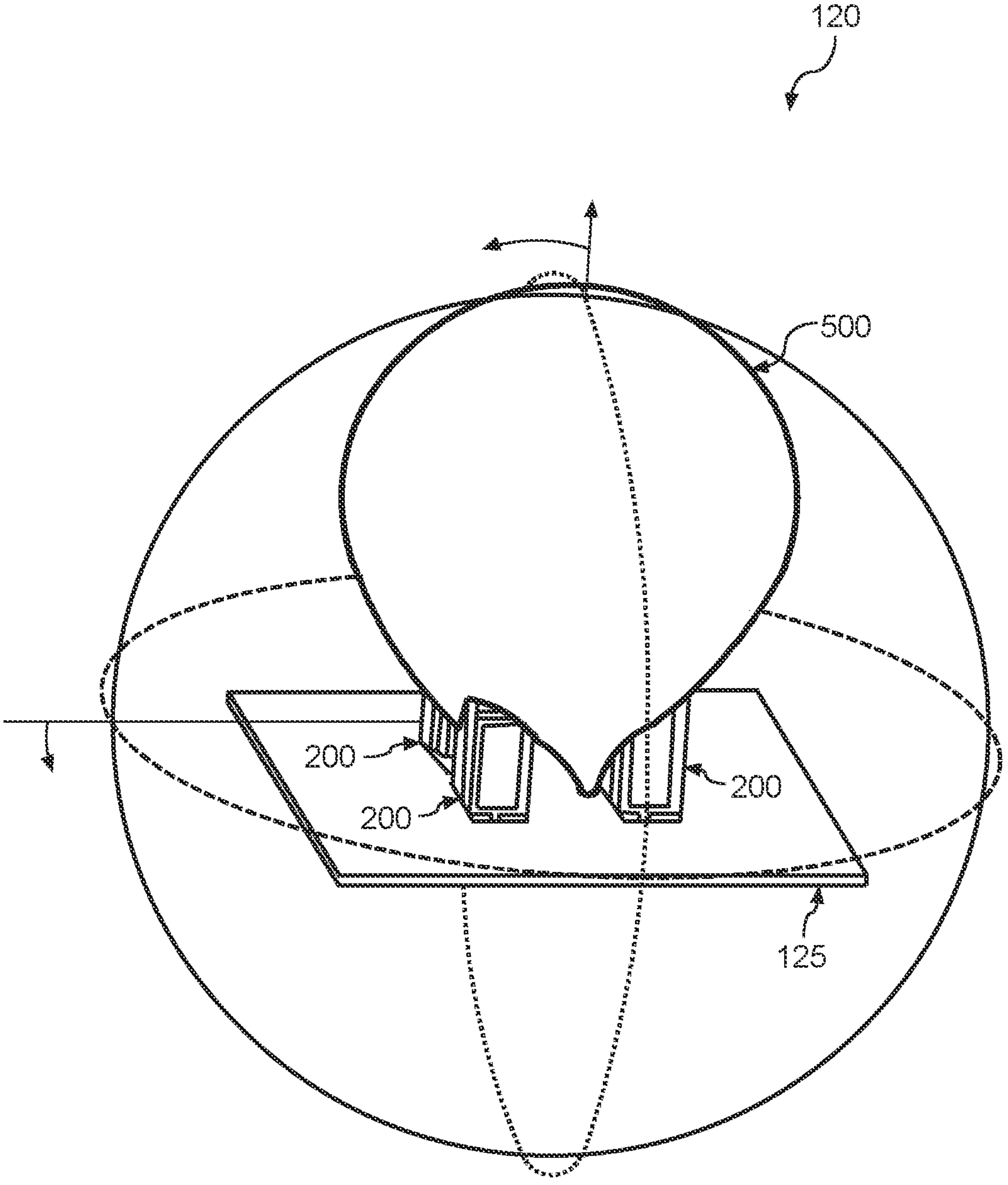
FIG. 7 depicts a graphical illustration of a radiation pattern associated with a circularly polarized array antenna according to example embodiments of the present disclosure.

Referring now to FIG. 7, a radiation pattern 500 associated with the circularly polarized array antenna 120 (FIG. 2) is provided according to example embodiments of the present disclosure. It should be appreciated that the ground plane 125 prevents backpropagation of the radiation pattern 500. In this manner, the radiation pattern 500 is directed away from the ground plane 125 of the polarized array antenna 120.

Figure 8:
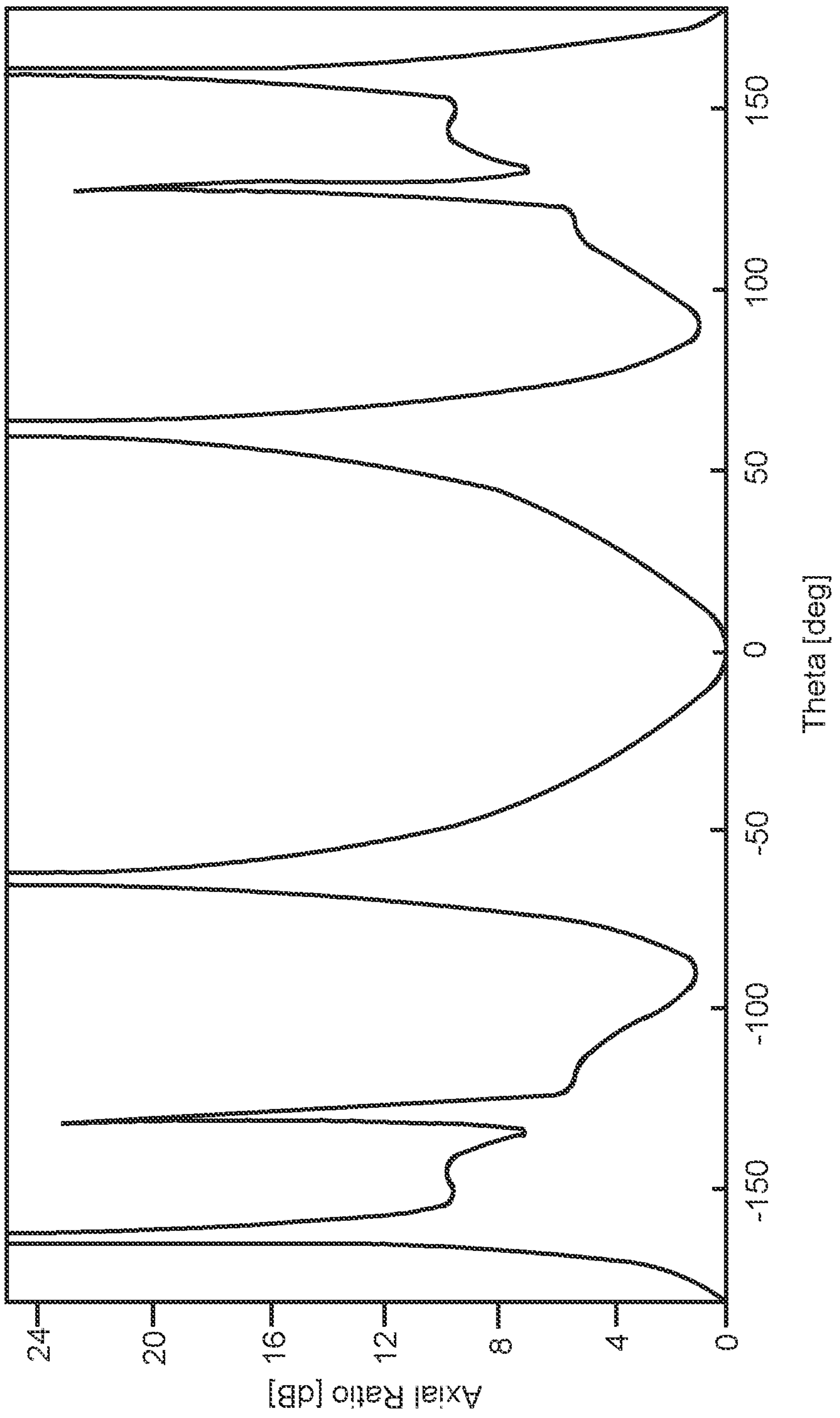
FIG. 8 depicts a graphical illustration of an axial ratio associated with a radiation pattern of a circularly polarized array antenna according to example embodiments of the present disclosure.

Referring now to FIG. 8, a graphical illustration of an axial ratio associated with a radiation pattern of the circularly polarized array antenna is provided according to example embodiments of the present disclosure. As shown, the axial ratio is depicted as a function of an angle. The axial ratio is denoted along the vertical axis in decibels (dB), and the angle is denoted along the horizontal axis in degrees. As shown, the axial ratio is substantially equal to zero when the angle corresponds to zero degrees. It should be appreciated that an angle of zero degrees corresponds to a zenith axis associated with a radiation pattern of the circularly polarized antenna.

Figure 9:
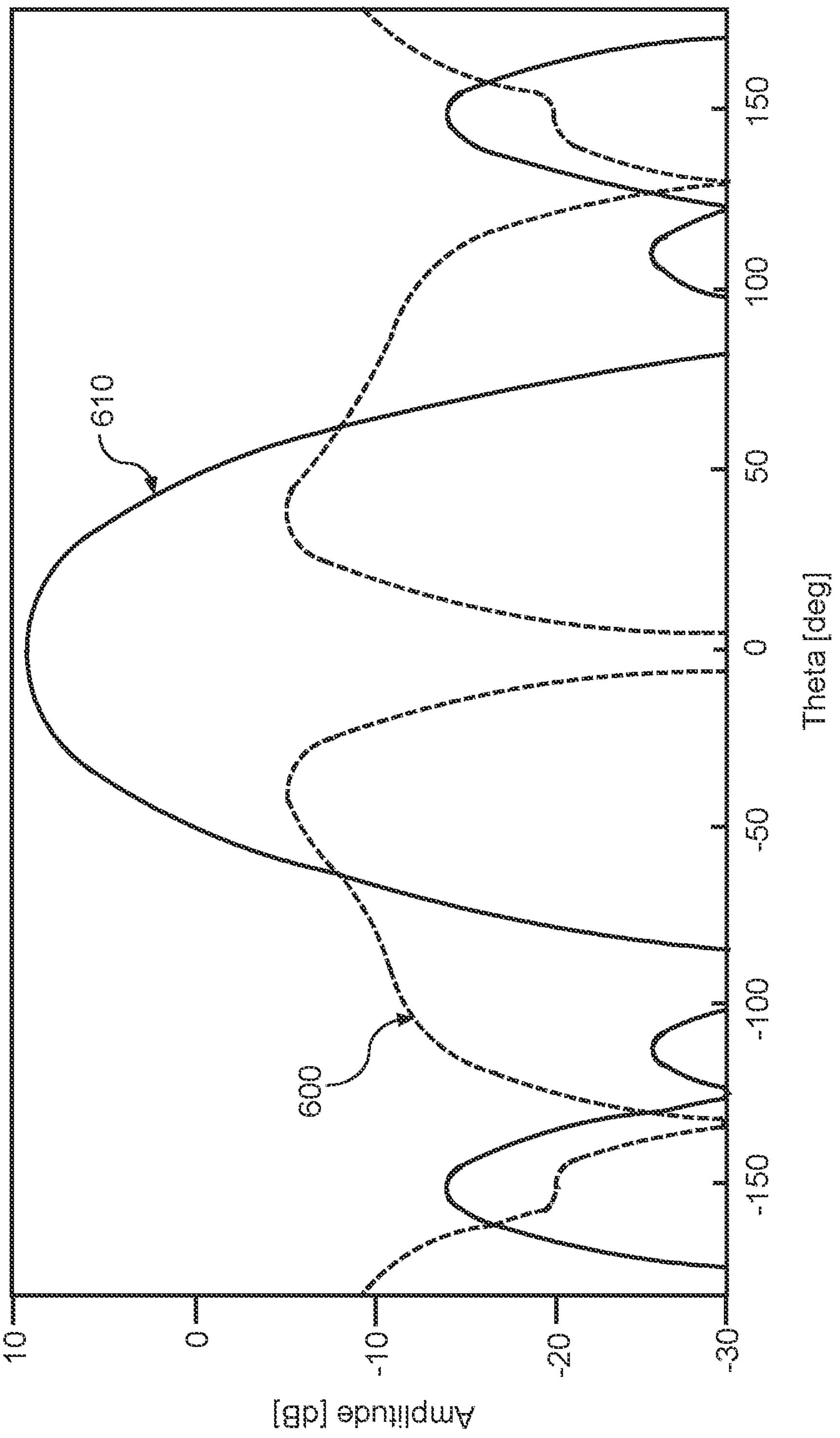
FIG. 9 depicts a graphical illustration of gain associated with first and second radiation patterns of a circularly polarized array antenna according to example embodiments of the present disclosure.

Referring now to FIG. 9, a graphical illustration of gain associated with a first radiation pattern 600 (e.g., left-hand circularly polarized) associated with the circularly polarized array antenna and a second radiation pattern 610 (e.g., left-hand circularly polarized) associated with the circularly polarized array antenna. As shown, the gain is depicted as a function of an angle. The gain is denoted along the vertical axis in decibels (dB), and the angle is denoted along the horizontal axis in degrees.

Figure 10:
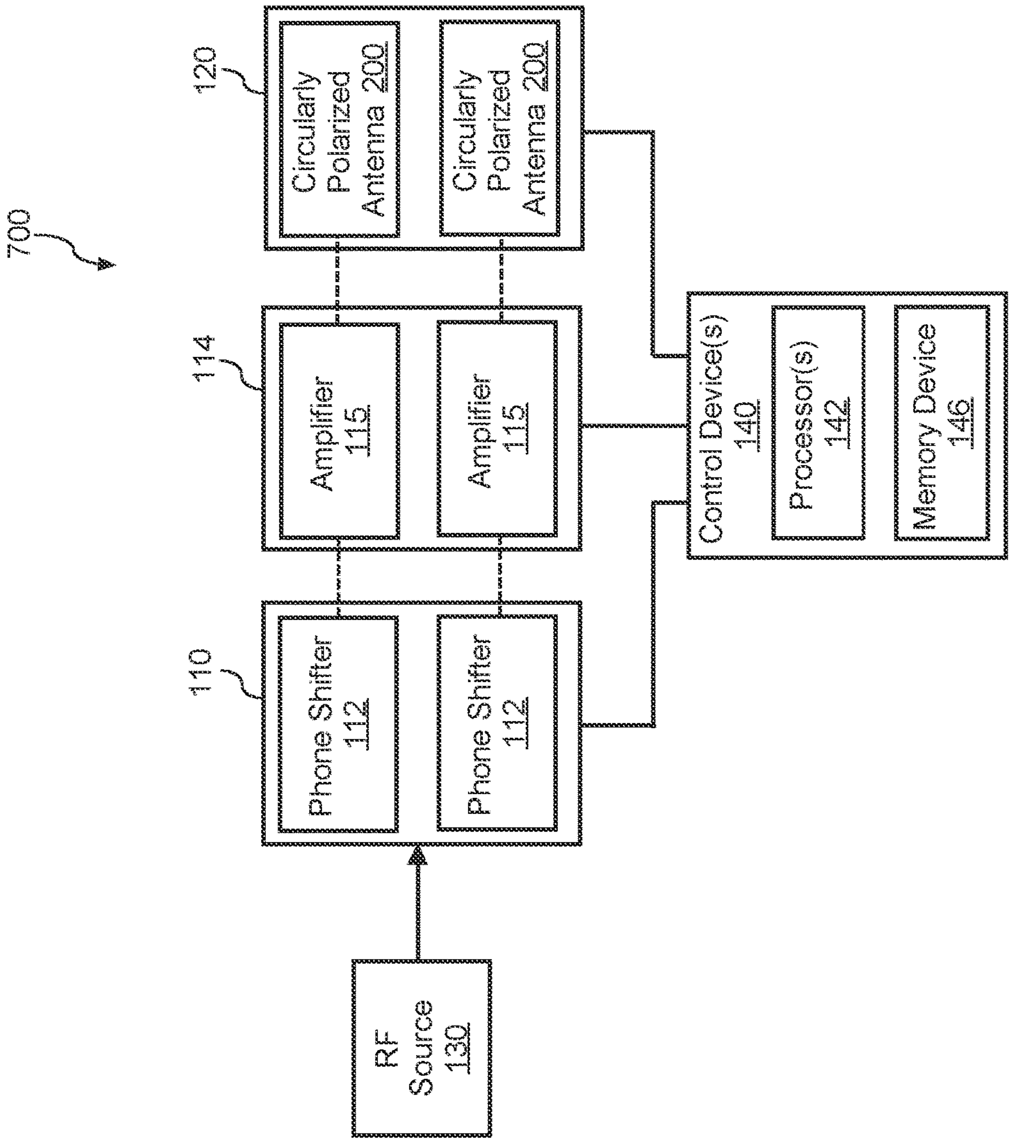
FIG. 10 depicts a block diagram of components of another antenna system according to example embodiments of the present disclosure.

Referring now to FIG. 10, another antenna system 700 is provided according to example embodiments of the present disclosure. It should be understood that the antenna system 700 can be configured in substantially the same manner as the antenna system 100 discussed above with reference to FIG. 1. For instance, the antenna system 700 can include the RF phase shifter circuit 110 and the circularly polarized array antenna 120.

Furthermore, in contrast to the antenna system 100 of FIG. 1, the antenna system 700 of FIG. 10 can include an amplitude control circuit 114. The amplitude control circuit 114 can include a plurality of amplifiers 115. Each of the amplifiers 115 can be electrically coupled to a corresponding millimeter wave phase shifter 112 of the RF phase shifter circuit 110 and a corresponding circularly polarized antenna 200 of the circularly polarized array antenna 120. In this manner, each of the amplifiers 115 can amplify a phase-shifted RF signal received from the corresponding millimeter wave phase shifter 112 and provide an amplified phase-shifted RF signal to the corresponding circularly polarized antenna 200.

In some implementations, the one or more control devices 140 can be communicatively coupled to the amplitude control circuit 114. For instance, the one or more control devices 140 can be communicatively coupled to each of the amplifiers 115. In this manner, the one or more control devices 140 can independently control operation each of the amplifiers 115. For instance, in some implementations, the one or more control devices 140 can control operation of the amplifiers 115 such that only a subset of the plurality of phase-shifted RF signals the amplitude control circuit 114 receives from the RF phase shifter circuit 110 are amplified. In alternative implementations, the one or more control devices 140 can control operation of the amplifiers 115 such that each of the phase-shifted RF signals the amplitude control circuit 114 receives from the RF phase shifter circuit 110 are amplified.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An array antenna comprising: a ground plane; a phase shifter circuit comprising a plurality of phase shifters, each of the plurality of phase shifters electrically coupled to a radio frequency (RF) source, the RF source configured to provide a RF signal to the phase shifter circuit; and a plurality of antennas arranged on the ground plane in a row-column configuration, each of the plurality of antennas configured to communicate over a frequency band ranging from 24 GHz to 52 GHz, each of the plurality of antennas comprising: a column substrate coupled to the ground plane, the column substrate having a plurality of faces, such that the phase shifter circuit configured to provide the RF signal to each of the plurality of faces and configured to adjust a phase angle associated with the RF signal, the phase angle of the RF signal provided to each of the plurality of faces of the column substrate are different; a plurality of antenna elements, each of the plurality of antenna elements disposed on a different face of the plurality of faces of the column substrate, wherein each of the plurality of antenna elements comprises: a bottom portion; a first vertical portion extending from the bottom portion; a second vertical portion extending from the bottom portion; a first horizontal portion extending from the first vertical portion; and a second horizontal portion extending from the second vertical portion; and one or more parasitic elements, each of the one or more parasitic elements disposed on a different face of the column substrate, each of the one or more parasitic elements electrically coupled to a corresponding antenna element.

2. The array antenna of claim 1, wherein each of the plurality of antenna elements forms a capacitive region between the first horizontal portion and the second horizontal portion.

3. The array antenna of claim 2, wherein each of the plurality of antenna elements forms a loop about which an inductive region is formed.

4. The array antenna of claim 1, wherein a radiation pattern associated with the array antenna is left-hand circularly polarized or right-hand circularly polarized.

5. The array antenna of claim 4, wherein a length of the ground plane is substantially the same as a width of the ground plane.

6. The array antenna of claim 1, wherein the plurality of antenna elements comprises: a first antenna element disposed on a first face of the column substrate; a second antenna element disposed on a second face of the column substrate; a third antenna element disposed on a third face of the column substrate; and a fourth antenna element disposed on a fourth face of the column substrate.

7. The array antenna of claim 1, wherein a height of the column substrate is shorter than a length of the ground plane and a width of the ground plane.

8. The array antenna of claim 1, wherein the frequency band ranges from 24 GHz to 30 GHz.

9. The array antenna of claim 1, wherein the frequency band ranges from 30 GHz to 40 GHz.

10. The array antenna of claim 1, further comprising: an amplitude control circuit comprising a plurality of amplifiers, each of the plurality of amplifiers coupled between a corresponding phase shifter of the phase shifter circuit and a corresponding antenna element of the array antenna, each of the plurality of amplifiers configured to amplify a phase-shifted RF signal received from the corresponding phase shifter.

* * * * *